H. K. HESS.
MOTIVE POWER APPARATUS.
APPLICATION FILED OCT. 30, 1906.
912,567.
Patented Feb. 16, 1909.
3 SHEETS—SHEET 1.
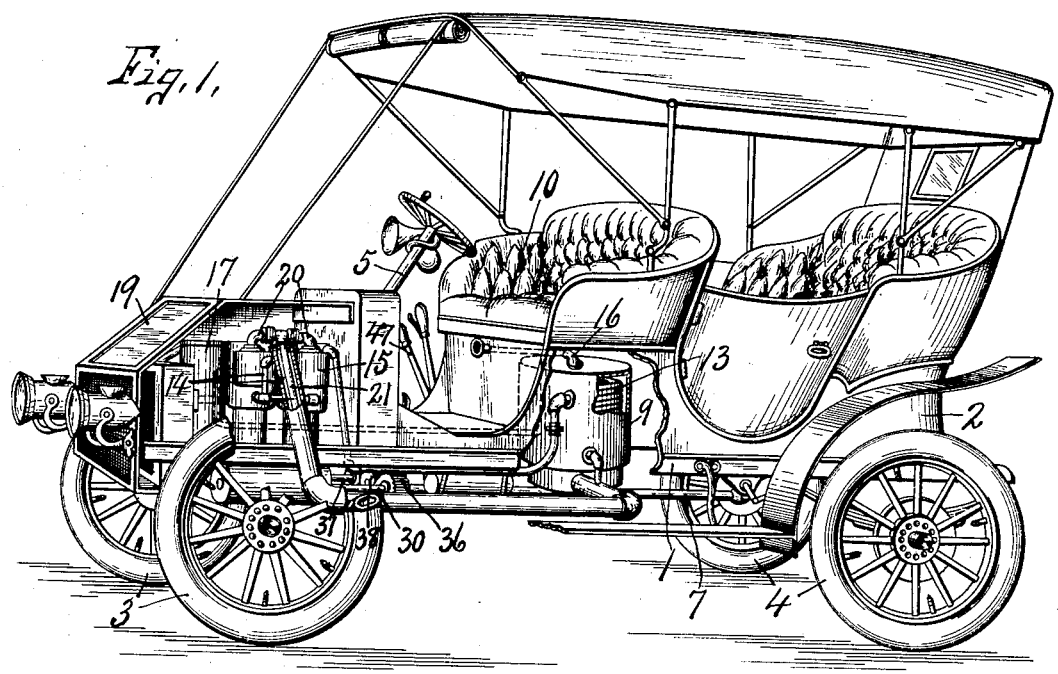
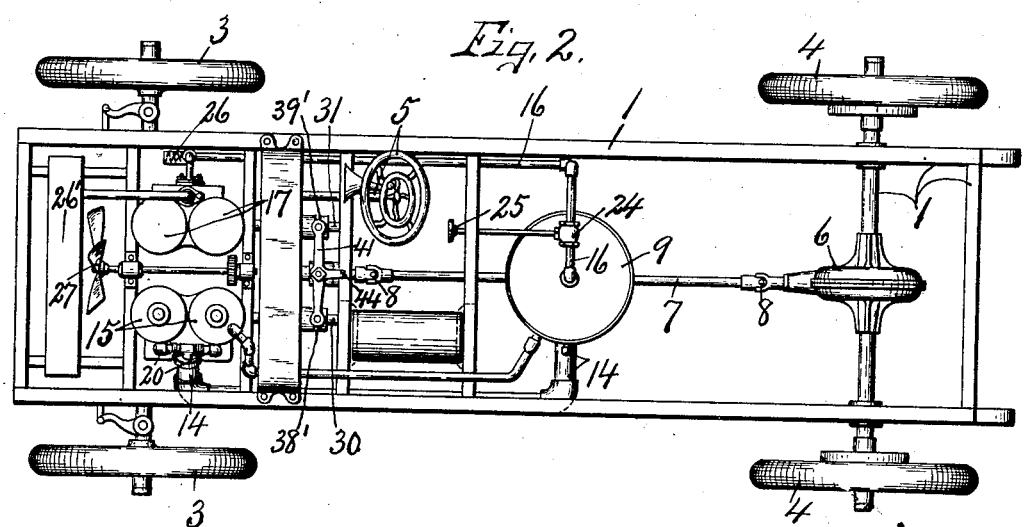
Witnesses.
Inventor.
Henry K. Hess
By
Howard P. Denison
Attorney.

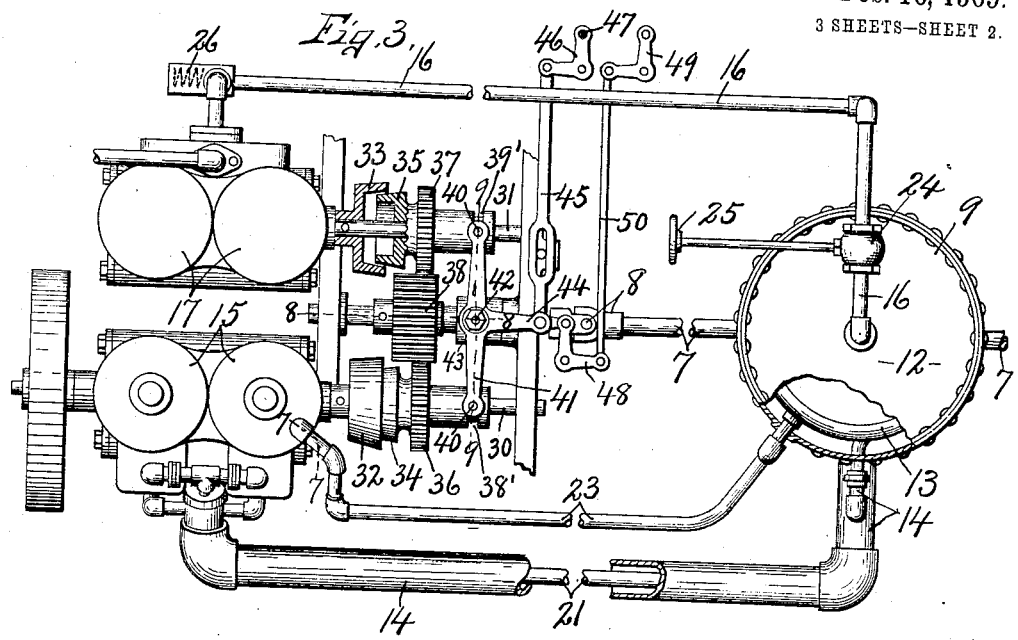
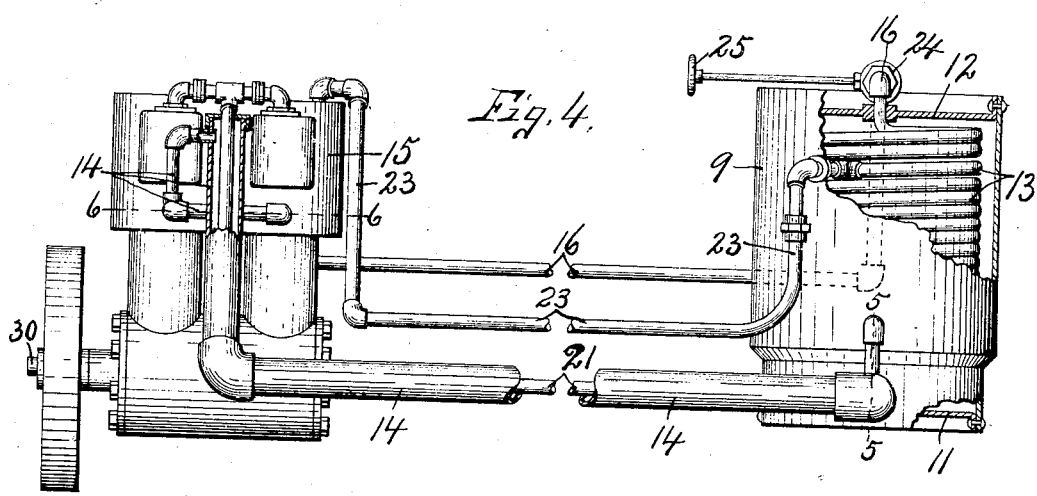

H. K. HESS.
MOTIVE POWER APPARATUS.
APPLICATION FILED OCT. 30, 1906.
912,567.
Patented Feb. 16, 1909.
3 SHEETS—SHEET 3.
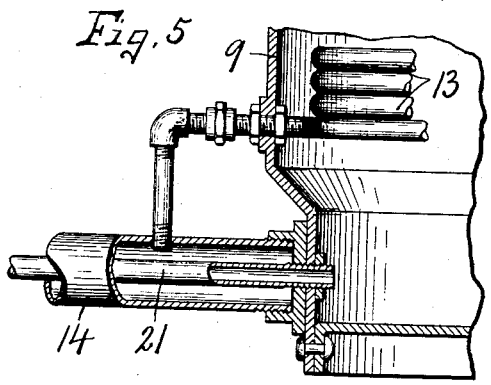
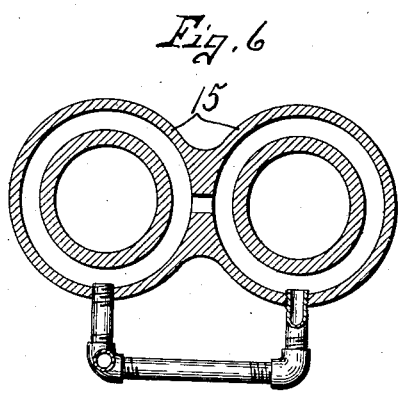
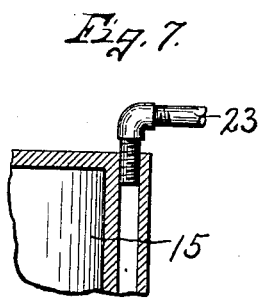
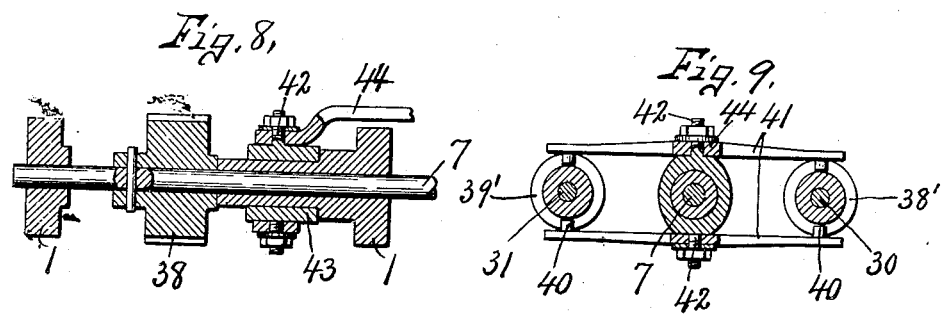
Witnesses:
Inventor
Henry K. Hess
By
Howard P. Denison
atty

UNITED STATES PATENT OFFICE.

HENRY K. HESS, OF PHILADELPHIA, PENNSYLVANIA.

MOTIVE-POWER APPARATUS.

No. 912,567.  Specification of Letters Patent.  Patented Feb. 16, 1909.

Application filed October 30, 1906. Serial No. 341,290.

*To all whom it may concern:*

Be it known that I, HENRY K. HESS, of Philadelphia, in the county of Philadelphia, in the State of Pennsylvania, have invented new and useful Improvements in Motive-Power Apparatus, of which the following, taken in connection with the accompanying drawings, is a full, clear, and exact description.

This invention relates to certain improvements in motive power apparatus for self-propelled vehicles of the class set forth in my pending application No. 149,118, filed March 23, 1903, in which the heat of the exploded gases of a gas engine is utilized to generate steam, which in turn, is used in the operation of a steam engine, both engines being employed either individually or jointly in the propulsion of the vehicle. It is well known that the temperature of these exploded gases reaches a very high degree, far in excess of that produced by any open flame burner, and that in many self-propelled vehicles in which gas or vapor engines are used as the motive power apparatus, the highly heated products of combustion are allowed to escape to the atmosphere, thereby losing a considerable power which I have sought to utilize to generate steam for the operation of a steam engine in conjunction with a gas engine. By this method, I not only obtain a maximum resultant power from a given quantity of fuel, but utilize this power in the operation of an auxiliary motor.

My special object, therefore, is to combine in a single vehicle, two sources of motive power, either or both of which may be thrown into and out of operative connection with the running gear of the vehicle, thereby operating two motors with the same fuel required for the operation of the gas motor.

Aside from the materially increased power and ability to start the gas engine through the medium of the steam engine, another important object is that the explosion always takes place in a closed chamber as distinguished from the ordinary open-flame gas-burner which is commonly used in steam propelled vehicles, thus doing away with liability of explosion due to the leakage of the gas in the presence of the flame, and also obviating any liability of extinguishing the flame by excessive air drafts, especially when the car is in motion. This combined explosive and expansive power of the gases and steam is particularly useful in the propulsion of large touring cars and auto-trucks, and I have found by actual experiment that with the use of a multiple cylinder gas-engine in which the discharge of the exhaust is more frequent, the heat of the exhaust becomes a practical medium for the speedy translation of water into steam, and one of the distinguishing characteristics of my present invention over that shown in my pending application previously referred to, is the manner of connecting the exhaust of a plurality of explosion cylinders to a steam generator, whereby the exhaust from two or more cylinders may be carried through a single pipe and into a closed combustion chamber of a steam generator, from which the exhaust products of combustion are allowed to escape to the atmosphere under a comparatively low pressure, thereby obviating the necessity for mufflers.

Another distinguishing feature of my present device is the clutch mechanism of the transmission gear, whereby I am enabled to throw either or both engines into and out of operative connection with the running gear of the vehicle so that the vehicle may be propelled by either the steam engine or gas engine alone, or both may be combined to transmit power to a single shaft which makes it possible to use this combination in the propulsion of boats as well as wheel vehicles.

Other objects and uses relating to the specific structure of the various elements will be brought out in the following description.

In the drawings—Figure 1 is a perspective view of a touring car equipped with my improved motive power and transmission gear. Fig. 2 is a top plan of the running gear showing the relative location of various parts of the mechanism, the body of the vehicle being removed. Fig. 3 is an enlarged top plan, partly broken away, and partly in section, of the front part of the mechanisms seen in Fig. 2, showing particularly the pipe connections between the steam boiler and engine, and also showing the clutch mechanism of the transmission gear partly in elevation, and partly in section. Fig. 4 is a side elevation of the parts seen in Fig. 3. Figs. 5, 6, and 7 are sectional views taken respectively on lines 5—5, and 6—6 Fig. 4 and 7—7, Fig. 3. Figs. 8 and 9 are enlarged sectional views taken respectively on lines 8—8 and 9—9 Fig. 3.

Practically the entire mechanism forming the subject matter of this invention is mounted upon a suitable supporting frame —1— for receiving and supporting a superposed body —2—, and which is provided with suitable front steering wheels —3— and rear traction wheels —4—, the steering wheels being mounted upon the usual horizontally oscillating axle stubs, which are connected to the steering post, as —5—, in any well known manner not necessary to herein illustrate and describe. The rear traction wheels are also mounted in the usual manner upon revolving axle sections which are journaled in the frame and are connected by the usual compensating gears. These compensating gears are too well known to need further description and are usually mounted in a gear case, as —6—, forming a part of the frame which incloses the rear axle sections.

Motion is transmitted from the engines to the compensating gears through the medium of a central lengthwise sectional shaft —7—, the sections of which are connected by universal joints —8—. This shaft extends forwardly and rearwardly under the longitudinal center of the frame —1— and body —2— and forms a part of the mechanism for transmitting motion from the engine to the rear axle or traction wheels.

An upright steam boiler —9— is mounted centrally within and upon the frame —1— and preferably, directly beneath the front seat, as —10—, and above the central shaft —7—, said boiler being of a hollow cylindrical type having lower and upper end heads —11— and 12— forming a closed combustion chamber in which is located a water pipe or conduit, consisting in this instance, of a water coil —13— extending from the base to the top of the boiler —9— forming a comparatively shallow tortuous conduit, one end of the coil being connected by a pipe 14— to the water jackets of a multiple cylinder gas engine —15— while the upper end is connected to a steam pipe —16— leading to the inlet ports of a double cylinder steam engine 17—. It is evident, however, that any other form of steam boiler may be used having a closed combustion chamber for the reception of the heated products of combustion from the exhaust of the gas engine adapted to envelop or come in contact with water circulating pipes in the boiler so as to convert the water into steam to be used in the operation of a steam engine. These engines are located side by side, preferably in an upright position, upon the front end of the frame —1— some distance in front of the seat —10— where they are readily accessible for repairs and are protected from the elements by a suitable hood —19—, as best seen in Fig. 1.

The gas engine cylinders are surrounded by the usual water jackets, not necessary to herein illustrate or describe, but which are connected by a comparatively large water circulating pipe —14— to the water circulating pipes in the boiler —9—, as previously described. The exhaust ports of these gas engine cylinders are connected by pipes —20— to a single pipe —21— which is passed through the water circulating pipe —14— and discharges into the combustion chamber in the base of the boiler —9—, as best seen in Fig. 5. The exhaust pipe is, therefore, water-jacketed throughout substantially its entire length from the gas engine to the boiler, and this water jacket not only protects the pipe from burning out under the excessive heat of the exhaust, but also serves as a means for augmenting the conversion of the water into steam in transit to the boiler.

It is desirable to establish a water circulating system between the water tubes of the boiler and water jacket of the engine, and for this purpose I have connected the intermediate portion of the water tubes with the water jacket of the engine through the medium of a separate circulating pipe —23—, whereby the pressure from the boiler is equalized in the circulating system and which allows the free circulation of the water through the pipes —23— and —14—.

The steam pipe —16— leading from the boiler to the steam engine —17— is provided with a valve —24— having a hand operating member —25— within easy reaching distance from the front seat of the vehicle, as best shown in Fig. 1, for manually controlling the passage of steam from the boiler to the engine. In addition to this manual control of the steam, I have provided the pipe —16 with an automatic valve —26—, similar to that shown in my pending application previously referred to and consisting of a spring-closed valve adapted to be automatically opened against the action of the spring by a predetermined degree of steam pressure.

Any self-closing valve connected in the pipe —16 between the boiler and steam engine adapted to be opened by a predetermined pressure of steam will serve my present purpose, and I do not herein claim any specific structure of such valve, but do claim generically the inter-position of such valve between the boiler and steam engine, whereby when a predetermined degree of steam pressure is generated by the heat of the exhaust of the gas engine, it will be automatically diverted to the steam engine and operate the latter without attention from the attendant.

The exhaust from the steam engine may be conducted to the atmosphere through any suitable muffler or through any suitable condenser, as —26'—, which is cooled by a fan —27— actuated by one or both of the engines in any desired manner, not necessary to herein illustrate or describe, as this part of the mechanism forms no part of my present invention.

As best shown in Fig. 3, the engines 15 and 17 are direct connected to their respective crank-shafts 30— and 31— running parallel with and at opposite sides of the lengthwise shaft —7—. The shaft —30— is provided with a clutch member 32— rigid thereon and therefore, rotating therewith and the shaft —31— is provided with a similar clutch member —33—, also rigid therewith. Loosely mounted upon the shafts —30— and 31— are clutch members —34— and —35— which are adapted to be moved axially into and out of frictional engagement with their respective clutch members —32— and —33—, said clutch members —34— and —35— being rigidly connected to gears 36— and —37— which mesh with diametrically opposite sides of the gear —38— on the central shaft —7—. It, therefore, follows that the gears —36— and —37— are movable axially with their respective clutch members —34— and —35—, the gears —36— and —37— having sliding intermeshing engagement with the gear —38—.

It is desirable to provide means whereby either the gas engine or steam engine may be operatively connected to drive the central shaft —7— independently of the other and at the same time to enable both engines to be connected to drive said shaft simultaneously, and for this purpose I have provided the clutch members —34— and —35— with axially extending hubs having annular grooves —38'— and —39'— for the reception of pins —40— on the opposite ends of a lever —41—. This lever is pivoted at —42— to a sleeve —43— which is movable axially upon the shaft —7— and is provided with an axially extending crank-arm —44— to which one end of a link —45— is pivotally connected, the opposite end of said link being pivotally connected to a bell-crank lever —46—, which is operated by a hand lever —47—, or by any other means capable of rocking the bell crank in opposite directions.

It is apparent upon reference to Fig. 3 of the drawings that if the bell-crank lever —46— is rocked in one direction similar motion will be transmitted to the lever —41— through the medium of the link —45— thereby forcing one of the clutch members, as —34—, into frictional engagement with its companion clutch member —32—, while the other clutch member will be simultaneously thrown out of action, thereby operatively connecting the gas engine with the driving shaft —7— through the medium of gears —36— and —38—. During this operation of the gas engine the heated exhaust products of combustion therefrom are diverted through the exhaust pipe —21— and its surrounding water jacket —14— and into the combustion chamber of the boiler —9— where the water in the coils —13— is converted into steam and the steam is then diverted through the pipe —16— to the steam engine for operating the latter. Now, if it is desired to operate the vehicle by means of the steam engine, irrespective of the gas engine, the bell-crank lever —46— may be operated to throw the clutch —35— into frictional engagement with its companion clutch member —33— and at the same time throwing the clutch member —34— out of action, such operation being effected through the medium of the link —45— and lever —41—. Both of these clutch members —34— and —35— are normally held out of frictional engagement with their respective clutch members —32— and —33— by throwing the bell-crank lever —46— to its intermediate position, permitting either the gas engine or steam engine to operate without transmitting motion to the shaft —7—.

If it is desired to utilize the power of both engines in the propulsion of the vehicle the lever —41— and sleeve —43— to which it is pivoted, may be moved bodily axially of the shaft —7— through the medium of bell-crank levers —48— and —49— and a connecting link —50—, thereby throwing both clutches —34— and —35— simultaneously into frictional engagement with their respective clutch members —32— and —33— and transmitting motion from both engines to the shaft —7— through the medium of gears —36—, 37— and 38—.

It is now clear that either engine may be operated independently of the other without driving the shaft —7—, and that either engine may be thrown into and out of operative connection with said shaft for propelling the vehicle irrespective of the other, or both engines may be simultaneously connected to the main driving shaft —7— and used simultaneously to propel the vehicle, it being understood, of course, that both engines are connected to drive the shaft in the same direction.

Any suitable reverse drive or variable speed transmitting mechanism not necessary to herein illustrate or describe, may be employed in connection with the driving shaft to reverse the motion of the vehicle or to drive it at a different speed.

I have now clearly set forth the essential elements of my invention consisting first, in utilizing the heat of the exhaust from the gas engine to generate steam adapted to be used in the operation of a steam engine, both engines being mounted upon the vehicle and adapted to be thrown into and out of operative connection with the running gear so that either engine may be used individually irrespective of the other, as the propelling power, or both engines may be operated individually or simultaneously irrespective of the main driving shaft, or both engines may be employed simultaneously in the propulsion of the vehicle.

What I claim is:

1. In a self-propelled vehicle, a steam boiler having a closed combustion chamber, a multiple-cylinder gas engine, a single pipe leading from the combustion chamber of the boiler to the explosion chambers of the gas engine, water jackets surrounding the cylinders of the gas engine, a water jacket surrounding the exhaust pipe and communicating with the water chamber in the boiler, a steam engine receiving steam from the boiler, crank-shafts direct connected to their respective engines, an intermediary shaft connected to the driving wheels of the vehicle, and means for alternately connecting the crank-shafts with the intermediary shaft.

2. In a self-propelled vehicle, a multiple-cylinder gas engine and a steam engine both mounted side by side upon the vehicle, separate crank-shafts direct connected to their respective engines, a boiler also mounted on the vehicle and having a closed combustion chamber, a water-jacketed pipe connecting the combustion chamber of the boiler with the exhaust of the gas engine, whereby the heat of the exhaust generates steam in the boiler, means for diverting the steam from the boiler to the steam engine, a driven shaft connected to the traction wheels of the vehicle, a gear on the driven shaft, clutch members rigid on the crank-shafts, additional clutch members loose on the crank-shafts and movable separately into and out of engagement with their respective fixed clutch members, and gears rigid with the loose clutch members and engaged with the gear on the driven shaft, said engines and their crank-shafts being operable independently of the driven shaft.

3. In a self-propelled vehicle, a multiple-cylinder gas engine and a steam engine both mounted upon the vehicle, a boiler also mounted upon the vehicle and provided with a closed combustion chamber, a pipe leading from the exhaust of the gas engine into the combustion chamber of the boiler whereby the heat of the exhaust converts the water in the boiler into steam, water-jackets inclosing the cylinders of the gas engine, an additional water jacket inclosing the exhaust pipe and having one end communicating with the water jackets of the gas engine cylinders and its other end communicating with the water chamber in the boiler, and an additional water circulating pipe connecting the water jackets of the gas engine with the water chamber of the boiler to establish a water circulation between the boiler and the water jackets of the gas engine, separate crank-shafts direct connected to the engines, a driven shaft connected to the traction wheels of the vehicle, and means for connecting either of the crank-shafts with the driven shaft independently of the other.

In witness whereof I have hereunto set my hand this sixteenth day of October 1906.

HENRY K. HESS.

Witnesses:
SADIE I. HARPER,
G. G. SMITH.